(12) United States Patent
Hart

(10) Patent No.: US 9,353,509 B2
(45) Date of Patent: May 31, 2016

(54) ELONGATE CONTINUOUS FLOW CONTROLLER WITH WEB-SHAPED OR STRING-SHAPED FLOW RESTRICTOR

(71) Applicant: Neoperl GmbH, Mullheim (DE)

(72) Inventor: Keith Hart, Welland (GB)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 14/399,095

(22) PCT Filed: Jul. 2, 2013

(86) PCT No.: PCT/EP2013/001929
§ 371 (c)(1),
(2) Date: Nov. 5, 2014

(87) PCT Pub. No.: WO2014/023378
PCT Pub. Date: Feb. 13, 2014

(65) Prior Publication Data
US 2015/0129684 A1    May 14, 2015

(30) Foreign Application Priority Data
Aug. 10, 2012 (DE) ............... 20 2012 007 719 U

(51) Int. Cl.
*B05B 7/12* (2006.01)
*E03C 1/084* (2006.01)
(Continued)

(52) U.S. Cl.
CPC . *E03C 1/084* (2013.01); *E03C 1/08* (2013.01); *G05D 7/012* (2013.01); *E03C 2001/026* (2013.01)

(58) Field of Classification Search
CPC ..... E03C 1/08; E03C 1/084; E03C 2001/026; E03C 1/086; G05D 1/012; B05B 7/12; B05B 7/1254; B05B 7/0425

USPC .......... 239/428.5, 590.5, 590, 533.1, 533.13, 239/533.14, 597–598, 553, 542; 138/40, 138/42, 43, 45, 46
See application file for complete search history.

(56) References Cited

U.S. PATENT DOCUMENTS 2,423,155 A * 7/1947 Phillips ............... G05D 7/0186
138/40
3,847,178 A * 11/1974 Keppel ..................... F16K 1/36
137/515.7

(Continued)

FOREIGN PATENT DOCUMENTS

DE       10228490          11/2003
DE       10228490 C1 *    11/2003    .............. G05D 7/012

(Continued)

*Primary Examiner* — Arthur O Hall
*Assistant Examiner* — Joseph A Greenlund
(74) *Attorney, Agent, or Firm* — Volpe and Koenig, P.C.

(57) ABSTRACT

A sanitary insertion unit (1) having an insertion housing (2), which can be inserted into a sanitary supply line and has a continuous flow controller (3), which has at least one through flow opening (4) through which a fluid flows, in which through flow opening (4) a flow restrictor (5) is provided, which is arranged in an installation plane oriented transversely to the flow direction, and delimits a control gap (12, 13) between itself and an adjacent wall (10, 11) that delimits the through flow opening (4). The insertion unit (1) according to the invention is characterized in that the through flow opening (4) is designed as an elongated hole, the longitudinal extent thereof being arranged transverse to the direction of flow, and in that the flow restrictor (5) is designed as a web shape or a string shape and is held with its web or string ends (6, 7) on the wall sections (8, 9) that are oriented transversely to the longitudinal extent of the flow restrictor (4) in such a manner that the flow restrictor (5) is orientated in the region of the elongated hole in the longitudinal elongation thereof.

16 Claims, 2 Drawing Sheets

(51) Int. Cl.
*E03C 1/086* (2006.01)
*E03C 1/08* (2006.01)
*G05D 7/01* (2006.01)
*E03C 1/02* (2006.01)

(56) References Cited

U.S. PATENT DOCUMENTS

| | | | | |
|---|---|---|---|---|
| 4,418,725 A * | 12/1983 | Mouterde | ............... | D03C 1/20 139/59 |
| 5,628,462 A * | 5/1997 | Miller | ............... | A01G 25/023 239/542 |
| 6,571,831 B1 * | 6/2003 | Hart | ............... | G05D 7/012 138/45 |
| 6,695,011 B2 * | 2/2004 | Sochtig | ............... | G05D 7/012 137/516.15 |
| 7,648,085 B2 * | 1/2010 | Mavrakis | ............... | 138/40 |
| 8,418,937 B2 * | 4/2013 | Staedtler | ............... | E03C 1/086 239/428.5 |
| 8,561,922 B2 * | 10/2013 | Staedtler | ............... | E03C 1/08 239/428.5 |
| 8,561,923 B2 * | 10/2013 | Staedtler | ............... | E03C 1/084 239/428.5 |
| 9,068,328 B2 * | 6/2015 | Stadtler | ............... | E03C 1/086 |
| 2006/0237561 A1 * | 10/2006 | Park | ............... | A01G 25/023 239/542 |
| 2009/0230216 A1 * | 9/2009 | Stadtler | ............... | E03C 1/086 239/428.5 |
| 2010/0127101 A1 * | 5/2010 | Stadtler | ............... | E03C 1/086 239/428.5 |
| 2010/0213283 A1 | 8/2010 | Staedtler | | |
| 2013/0075496 A1 * | 3/2013 | Hart | ............... | B05B 1/3033 239/428.5 |
| 2013/0341422 A1 * | 12/2013 | Sochtig | ............... | E03C 1/08 239/8 |

FOREIGN PATENT DOCUMENTS

| | | | | |
|---|---|---|---|---|
| DE | 1933217 A1 * | 6/2008 | ............... | E03C 1/084 |
| DE | 102007047112 | 4/2009 | | |
| DE | 102012015947 A1 * | 5/2014 | ............... | E03C 1/08 |
| FR | 2117611 | 7/1972 | | |

* cited by examiner

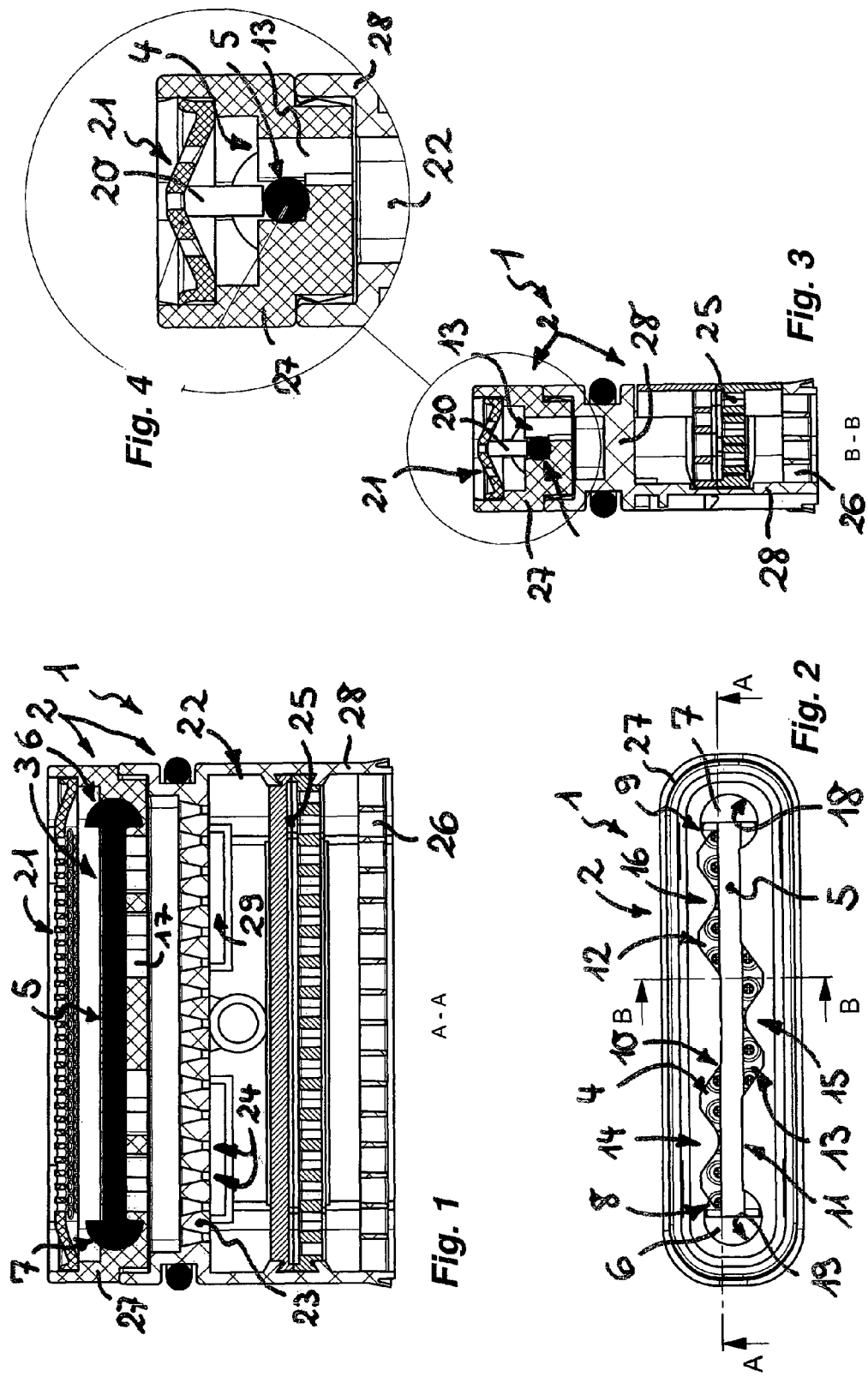

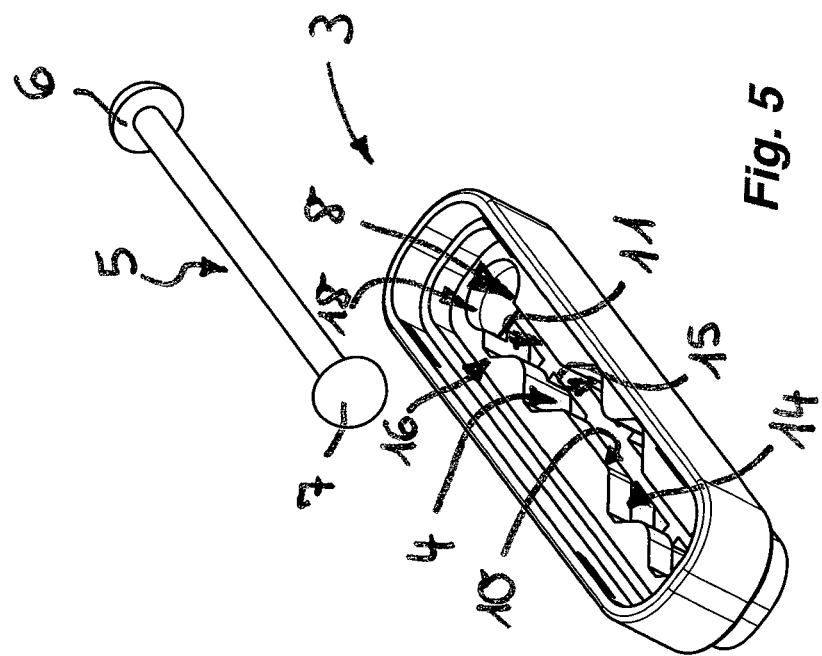

ELONGATE CONTINUOUS FLOW CONTROLLER WITH WEB-SHAPED OR STRING-SHAPED FLOW RESTRICTOR

BACKGROUND

The invention relates to a sanitary insertion unit having an insertion housing which is insertable into a sanitary supply line and which includes a continuous flow regulator which has at least one through flow opening with a fluid flowing therethrough and in which through flow opening a flow restrictor which is disposed in an installation plane which is transversely oriented to the direction of throughflow is provided, wherein at least one control gap which is disposed between a wall which is at least in sections profiled or contoured and which delimits the through flow opening and an adjacent outer side of the flow restrictor is provided, and wherein the flow restrictor, under pressure from the medium flowing through, is elastically deformable in such a manner that, by forming the flow restrictor into the profile feature or contour feature of the wall which is at least in sections profiled or contoured, the usable continuous flow cross section of the control gap is narrowed.

Various insertion units which are mountable on the water outlet of a sanitary outlet fitting by way of an insertion housing are already known. The insertion units known in the past include a jet controller which, at the water outlet, has to shape the inflowing water from the supply network into a homogenous, non-spraying and, if applicable, sparkling soft water jet. In order to tune the volume of water exiting from the water outlet to a defined maximum value per unit of time, independently of the water pressure, the jet controller, on the inflow side, upstream has a continuous flow regulator.

In this manner, a sanitary insertion unit of the type mentioned at the outset which includes in a circular housing section of its insertion housing a continuous flow regulator having an annular flow restrictor which is made from an elastic material and which delimits a control gap between itself and a profiled or contoured housing wall is already known from FR 2 117 611 A5. Under pressure from the water flowing through, the elastic flow restrictor is able to form into the profile features or contour features of the wall delimiting the control gap in such a manner that the control gap increasingly narrows as the pressure increases.

However, the annular shape of the flow restrictor which is made from an elastic material in the insertion unit known previously from FR 2 117 611 A5 requires a circular housing cross section of the insertion housing.

From DE 102 28 490 C1 a sanitary insertion unit having an insertion housing in which two coaxial continuous flow regulators having in each case an annular flow restrictor from an elastic material are provided, is known. Here the flow restrictor lying on the outside encompasses a central control pin in which a passage opening in which the second flow restrictor lying on the inside is disposed, is provided. Corresponding to the circular shape of the two coaxial flow restrictors, the insertion housing of this insertion unit known previously from DE 102 28 490 C1 also includes a circular housing cross section.

Also, sanitary outlet fittings have already been achieved which are to meet high aesthetic requirements and which have a water outlet which is rectangular in cross section and the opposite longitudinal sides of which, in comparison with the walls which are transversely oriented to the longitudinal extent and which form the broad sides, has a greater length. In order to also shape the water exiting from such a water outlet into a homogenous, non-spraying and, if applicable, sparkling soft water jet, jet controllers which are insertable into the water outlet and the jet controller housing of which has a housing cross section which is adapted in shape and is thus rectangular have already been achieved.

In this manner a jet regulator is previously known from DE 10 2007 047 112 A1, of which the jet regulator housing includes a housing cross section which is rectangular and therefore adapted to the outlet fitting which, in the usable cross section is likewise rectangular. The inflow-side end face of the jet regulator housing is formed by a distributor face which has a multiplicity of passage holes and is designated for distributing the inflowing water onto the rectangular continuous-flow cross section. In the fitting housing, a continuous flow regulator is provided ahead of the jet regulator and spaced apart therefrom in the direction of flow. This continuous flow regulator, with its insertion housing which is circular in cross section, is inserted into a line section which, in its usable cross section, is round.

In comparison with the continuous flow cross section of a rectangular jet controller, however, the usable continuous flow cross section of a round continuous flow regulator may be too small. Also, turbulences which may arise at the transition from the round continuous flow cross section of the continuous flow regulator to the rectangular continuous flow cross section of a rectangular jet controller, in particular in the region of the water outlet, are undesirable.

SUMMARY

There exists, therefore, in particular the object of providing a sanitary insertion unit of the type mentioned at the outset which in any case is advantageously utilizable with out-of-round line cross sections.

This object is met according to the invention in the insertion unit of the type mentioned at the outset in particular in that the through flow opening is configured as a slot hole which, with its longitudinal extent, is designed so as to be transverse to the direction of continuous flow, and that the flow restrictor is configured so as to be web-shaped or string-shaped, that the flow restrictor is configured so as to be web-shaped or string-shaped, and that the flow restrictor, with its web ends or string ends, is held on the wall sections which are transversely oriented to the longitudinal extent of the through flow opening in such a manner that the flow restrictor, in the region of the slot hole, is oriented in the longitudinal extent of the latter.

The insertion unit according to the invention includes an insertion housing which is insertable into a sanitary supply line. The insertion housing here may be designed such that the insertion unit according to the invention may be employed, for example, at the water outlet of a sanitary outlet fitting and thus at the mouth of the sanitary supply line, or spaced apart therefrom, in the course of the supply line. The insertion unit according to the invention includes a continuous flow regulator which is either a component part of the insertion unit according to the invention or may be the latter's only functional component. The continuous flow regulator includes a through flow opening with water or a gas, and thus a fluid, flowing therethrough, which is designed as a slot hole which, with its longitudinal extent is transversely oriented to the direction of continuous flow and is thus designed so as to be out-of-round and in no case annular. A flow restrictor which is configured so as to be web-shaped or string-shaped and, therefore, on opposite sides in each case has a free web end or string end is provided in this through flow opening. This elongated flow restrictor is disposed in an installation plane which is transversely oriented to the direction of throughflow.

A control gap is provided at least between one wall which is at least in sections profiled or contoured and which delimits the through flow opening and the adjacent outer side of the flow restrictor. The flow restrictor here, under pressure from the medium flowing through, is elastically deformable in such a manner that, by forming the flow restrictor into the profile feature or contour feature of the wall which is at least in sections profiled or contoured, the usable continuous flow diameter of the at least one control gap with fluid flowing therethrough is increasingly narrowed as the pressure of the inflowing fluid increases.

It is provided according to the invention that the flow restrictor, with its web ends or string ends, is held on the wall sections which are transversely oriented to the longitudinal extent of the through flow opening in such a manner that the flow restrictor, in the region of the slot hole, is oriented in the longitudinal extent of the latter. Due to this, the flow restrictor which is situated in the through flow opening is securely held in its position in such a manner that it is always can interact in a functionally correct manner with the profiled or contoured region of the wall delimiting the through flow opening.

Due to the elastic deformability of the flow restrictor which is preferably manufactured from an elastic material, said flow restrictor automatically releases itself from the contour feature or the profile feature when the pressure decreases, such that the control gap is increasingly freed up and the continuous flow rate is adjusted to a determined value within a pressure range. Since the through flow opening, on the one hand, and the flow restrictor, on the other hand, are designed so as to be elongated and in no case annular, the insertion unit according to the invention, without being limited thereto, can be utilized in particular in conjunction with an out-of-round elongated continuous flow cross section.

In order for the regulating cross section to be able to be laid out as large as possible, it is advantageous for the flow restrictor, which is disposed in the at least one through flow opening, on both sides of its longitudinal sides, in each case to delimit one control gap between itself and the adjacent wall. However, it is also possible for such a control gap to be provided only along one of the longitudinal sides of the flow restrictor.

One preferred embodiment in which the flow restrictor can be particularly well formed into the contour feature or profile feature provides that the walls which are disposed on both longitudinal sides of the restrictor has a contour feature with V-shaped or W-shaped contour feature sections, which contour feature sections are alternatingly disposed on opposite longitudinal sides of the restrictor and that the openings of these V-shaped or W-shaped contour feature sections point in the direction of the flow restrictor.

In order for the deformability of the flow restrictor to be able to be concentrated on adjusting the continuous flow line, it is advantageous for the flow restrictor, in the direction of continuous flow, to be held in the through flow opening in an immovable manner and, transverse to the direction of continuous flow, in an elastically deformable manner.

To this end, one preferred embodiment of the invention provides that the flow restrictor bears on a perforated structure or grid structure which is disposed in the region of the through flow opening.

In order for the flow restrictor to be always secured in its adjustment position, it is expedient for the flow restrictor, on the inflow side, to be secured counter to the direction of throughflow in the through flow opening by means of at least one holding-down unit.

In order for loosened lime scale or for dirt items which have been entrained by the fluid not to be able to settle in the region of the control gap and to compromise the functioning of the insertion unit according to the invention, it is advantageous for the insertion housing, on the inflow side, to be releasably connectable to an attachment sieve or filter sieve.

It is particularly advantageous here for a holding-down unit to be provided on the outflow side on the attachment sieve or filter sieve.

One preferred embodiment according to the invention provides that at least one holding-down unit is configured as a holding-down pin which is oriented in the direction of continuous flow and is integrally molded on the attachment sieve or filter sieve.

In order to be able to clamp or mount the flow restrictor which is oriented in the longitudinal direction of the through flow opening on both sides on the short broad sides of the walls and wall sections delimiting the through flow opening, one preferred refinement according to the invention provides that the web ends or string ends of the web-shaped or string-shaped flow restrictor include a thickening, and that the thickenings of the flow restrictor are held in holding openings of the continuous flow regulator.

It is expedient for the through flow opening, on both sides of its wall sections which are transversely oriented to the longitudinal extent, to open out in the holding openings.

The insertion unit according to the invention may, however, also include an insertion housing which is circular in the cross section. However, in order for the insertion unit according to the invention to be able to be designed to be as compact as possible, it is advantageous for the insertion housing, at least in a part region, to have a rectangular cross section, and for the longitudinal sides of the insertion housing, compared thereto, in relation to the broad sides which are transversely oriented to the longitudinal extent of the insertion housing, to display a greater length.

In such an embodiment according to the invention it may be advantageous for the insertion housing to be configured in multiple parts and to include a jet controller housing and also a regulator housing which is releasably connectable to the jet controller housing.

One preferred embodiment according to the invention provides that the jet controller is configured as an aerated jet controller which includes a jet splitter which divides the inflowing water into a multiplicity of individual jets, and that the insertion housing has at least one aeration opening which is disposed in a housing part-region which is immediately downstream of the jet splitter.

It is advantageous for the flow restrictor, at least in a part-region which is, in particular, disposed between the string ends or web ends of the restrictor, to have a round or oval cross section.

Refinements according to the invention are derived from the claims, in conjunction with the figures and the description.

BRIEF DESCRIPTION OF THE DRAWINGS

The invention is described in more detail in the following by means of a preferred exemplary embodiment. In the drawings:

FIG. 1 shows a sanitary insertion unit which is illustrated in a longitudinal section and which has a continuous flow regulator which upstream, on the inflow side, has an attachment sieve or filter sieve and downstream, on the outflow side, has a jet controller, wherein the attachment sieve or filter sieve is releasably connectable to a regulator housing and the regulator housing of the continuous flow regulator is releasably connectable to a jet controller housing of the jet controller;

FIG. 2 shows the insertion unit from FIG. 1 in a plan view onto the inflow side of the continuous flow regulator, wherein the attachment sieve or filter sieve has been removed;

FIG. 3 shows the insertion unit from FIGS. 1 and 2, in a longitudinal section which, in comparison with FIG. 1, has been rotated by 90°;

FIG. 4 shows the insertion unit from FIGS. 1 to 3, in a detailed longitudinal section in the region of the continuous flow regulator which is, on the one hand, releasably connected to the attachment sieve or filter sieve and, on the other hand, to the jet controller; and FIG. 5 shows the continuous flow controller of the insertion unit shown in FIGS. 1 to 4, in a perspective plan view onto its component parts.

DETAILED DESCRIPTION OF THE PREFERRED EMBODIMENTS

In FIGS. 1 to 5, a sanitary insertion unit 1 and its component parts are illustrated. The insertion unit 1 displays an insertion housing 2 which is insertable into a sanitary supply line.

The insertion housing 1 illustrated here is designed such that it is insertable into the rectangular usable outlet cross section of a water outlet which forms the outlet-side end region of a sanitary outlet fitting which is not shown in more detail here.

The insertion unit 1 shown here includes a continuous flow regulator 3 which forms one of the component parts of the insertion unit 1. The continuous flow regulator 3 which is shown in more detail in FIG. 5 has a through flow opening 4 with inflowing water from the supply line flowing through it. The through flow opening 4 is configured as an elongated hole which, with its longitudinal extent, is transversely oriented to the direction of continuous flow and is thus designed so as to be out-of-round and in no case annular. A flow restrictor 5, which is configured so as to be web-shaped or string-shaped and, therefore, on the opposite sides has two free web ends or string ends 6, 7, is provided in this through flow opening 4.

This elongated restrictor 5 is disposed in an installation plane which is transversely oriented to the direction of throughflow and with its web ends or string ends 6, 7 is held on the wall sections 8, 9, which are transversely oriented to the longitudinal extent of the through flow opening 4 and which form broad sides which are, in comparison therewith, shorter, in such a manner that the restrictor 5, in the region of the elongated hole, is oriented in the longitudinal extent of the latter.

Between at least one wall 10, 11, which is at least in sections profiled or contoured and which delimits the through flow opening 4, and the adjacent outer side of the flow restrictor 5 in each case one control gap 12, 13 is provided. The flow restrictor 5 here, under pressure from the water flowing through, is elastically deformable in such a manner that by forming the flow restrictor 5 into the profile feature or contour feature of the wall 10, 11 which is at least in sections profiled or contoured, the usable continuous flow cross section of the control gap 12, 13 with water flowing therethrough is increasingly narrowed as the water pressure increases. Due to the elastic deformability of the flow restrictor 5 which is preferably manufactured from an elastic material, said flow restrictor 5 releases itself from the contour feature or the profile feature of the walls 10, 11 when the pressure decreases again, such that the at least one control gap 12, 13 is increasingly freed up and the continuous flow rate is adjusted to a determined maximum value. Since the through flow opening 4, on the one hand, and the flow restrictor 5, on the other hand, are designed so as to be elongated and in no case annular, the insertion unit 1 according to the invention, without being limited thereto, can be utilized preferably in conjunction with an out-of-round and, in particular, elongated continuous flow cross section.

In order for the continuous flow regulator to be able to adjust the continuous flow rate as well as possible, it is provided in the continuous flow regulator 3 shown here that the flow restrictor 5 which is disposed in the through flow opening 4, on both sides of its longitudinal sides, in each case delimits one control gap 12, 13 between itself and the adjacent wall 10, 11. It is evident here from the plan views in FIGS. 2 and 5, that the walls 10, 11 which are disposed on both longitudinal sides of the restrictor have a contour feature with, in this case, "W-shaped contour feature sections 14, 15, 16, which contour feature sections 14, 15, 16 are alternatingly disposed on opposite longitudinal sides of the restrictor 5, wherein the openings of these W-shaped contour feature sections 14, 15 and 16 point in the direction of the restrictor 5.

A comparison of FIGS. 2 and 5 reveals that the flow restrictor 5, in the direction of continuous flow, is held in the through flow opening 4 in an immovable manner and, transverse to the direction of continuous flow, in an elastically deformable manner. In order to be able to hold the flow restrictor 5 in the direction of continuous flow in an immovable manner in a plane, the flow restrictor 5 bears on a perforated structure or grid structure 17 in the outflow-side region of the through flow opening 4. In order for the flow restrictor 5 to remain elastically deformable in the direction of continuous flow, the flow restrictor 5 is held between the wall sections 8, 9 which form the short broad sides. It can be seen in FIGS. 1, 2 and 5 that the web ends or string ends 6, 7 of the web-shaped or string-shaped flow restrictor 5 in each case display one thickening and that the end-side thickenings of the flow restrictor 5 are held in holding openings 18, 19 of the continuous flow regulator 3. Here, the through flow opening 4, on both sides on the wall sections 8, 9 which are transversely oriented to the longitudinal extent, opens out in the holding openings 18, 19. In order for the flow restrictor 5 to be secured also counter to the direction of continuous flow and not to be able to uncontrollably float on the water flowing through, the restrictor 5, on the inflow side, is secured counter to the direction of throughflow in the through flow opening 4 by means of at least one holding-down unit 20.

It can be seen in FIGS. 1, 3 and 4 that the insertion housing 2 of the insertion unit 1, on the inflow side, is releasably connectable to an attachment sieve or filter sieve 21. The holding-down unit 20 is provided on the outflow side on this attachment sieve or filter sieve 21. The holding-down unit 20 here is configured as a holding-down pin which is oriented in the direction of continuous flow and is integrally molded on the attachment sieve or filter sieve 21.

A comparison of FIGS. 2 and 3 reveals that the insertion housing 2, at least in a part-region and here across its entire longitudinal extent, has a rectangular cross section, and that the longitudinal sides of the insertion housing, compared thereto, in relation to its housing broad sides, display a greater length.

It can be seen in FIGS. 1 and 3 that the insertion unit 1 also displays a jet controller 22, which, in the direction of flow, is downstream of the continuous flow regulator 3. This jet controller 22 here is configured as an aerated jet controller. The jet controller 22 has to shape the water flowing through and flowing out at the water outlet into a homogenous, non-spraying and, in this case, also sparkling soft water jet. To this end, the jet controller 22 which is downstream of the continuous flow regulator 3 has a jet splitter 23 which has to divide the water flowing through into a multiplicity of individual jets. The jet splitter 23, which here is configured as a perforated plate, to this end displays a corresponding number of through-flow holes 24, in the region of which the water flowing through experiences an increase in speed. Due to this increase in speed of the individual jets, negative pressure is created on the outflow side of the jet splitter 23 which is utilized for the aspiration of ambient air through the aeration openings 29, which ambient air may subsequently be mixed with the individual jets.

In order to be able to subsequently decelerate again the water which is mixed with the ambient air, at least one grid structure or mesh structure, which here is formed by an insert part 25 which is laterally insertable into the insertion housing and which displays a honeycomb-shaped tubular hole pattern, is downstream of the jet splitter and spaced apart therefrom.

A flow straightener 26, which is formed by a grid structure or mesh structure which here are integrally molded on the insertion housing 2 and which has to bring together the individual jets and form them into a homogenous water jet, is downstream of the insertion part 25, on the outflow side of the jet regulator. The insertion housing 2 is designed in multiple parts and displays a regulator housing 27 and a jet regulator housing 28 which is releasably connectable thereto.

LIST OF REFERENCE SIGNS

1 Insertion unit
2 Insertion housing
3 Continuous flow regulator
4 Through flow opening
5 Flow Restrictor
6 Web end (of the flow restrictor 5)
7 Web end (of the flow restrictor 5)
8 Short wall section (on the through flow opening 4)
9 Short wall section (on the through flow opening 4)
10 Wall (on the longitudinal side on the through flow opening 4)
11 Wall (on the longitudinal side on the through flow opening 4)
12 Control gap
13 Control gap
14 Contour feature section
15 Contour feature section
16 Contour feature section
17 Perforated structure or grid structure
18 Holding opening (on the one wall section)
19 Holding opening (on the other wall section)
20 Holding-down unit
21 Attachment sieve or filter sieve
22 Jet controller
23 Jet splitter
24 Continuous flow holes
25 Insertion part
26 Flow straightener
27 Regulator housing
28 Jet regulator housing
29 Aeration opening (on the jet regulator housing 28 of the insertion housing 2)

The invention claimed is:

1. A sanitary insertion unit (1) comprising an insertion housing (2) which is insertable into a sanitary supply line and which includes a continuous flow regulator (3) which has at least one through flow opening (4) adapted for a fluid to flow therethrough, a flow restrictor (5) disposed in the throughflow opening (4) in an installation plane which extends transversely to a direction of throughflow is provided, wherein at least one control gap (12, 13) is disposed between a wall (10, 11) which is at least in sections profiled or contoured and delimits the through flow opening (4) and an adjacent outer side of the flow restrictor (5), the flow restrictor (5), under pressure from the medium flowing through, is elastically deformable in such a manner that, by forming the flow restrictor (5) into a profile feature or contour feature of the wall (10, 11) which is at least in sections profiled or contoured, a usable continuous flow cross section of the control gap (12, 13) is narrowed, the through flow opening (4) is configured as an elongated hole which has a longitudinal extent that is transversely oriented to the direction of continuous flow, the flow restrictor (5) is configured web-shaped or string-shaped, having web ends or string ends (6, 7), and the flow restrictor (5) is held on wall sections (8, 9) which are transversely oriented to the longitudinal extent of the through flow opening (4) by the web ends or string ends in such a manner that the flow restrictor (5), in a region of the elongated hole, is oriented in the longitudinal extent of the latter.

2. The insertion unit as claimed in claim 1, wherein the flow restrictor (5) delimits on both sides of longitudinal sides thereof, in each case one of the control gaps (12, 13) between itself and an adjacent one of the walls (10, 11).

3. The insertion unit as claimed in claim 2, wherein the contour feature of the walls which are disposed on both longitudinal sides of the flow restrictor has V-shaped or W-shaped contour feature sections (14, 15, 16), said contour feature sections (14, 15, 16) are alternatingly disposed on opposite longitudinal sides of the flow restrictor (5) and openings of the V-shaped or W-shaped contour feature sections (14, 15, 16) point in a direction of the flow restrictor (5).

4. The insertion unit as claimed in claim 1, wherein the flow restrictor (5), in the direction of continuous flow, is held in the through flow opening (4) in an immovable manner and, transverse to the direction of continuous flow, in an elastically deformable manner.

5. The insertion unit as claimed in claim 4, wherein the flow restrictor (5) bears on a perforated structure or grid structure (17) which is disposed in a region of the through flow opening (4).

6. The insertion unit as claimed in claim 1, wherein the flow restrictor (5), on an inflow side, is secured counter to the direction of throughflow in the through flow opening (4) by at least one holding-down unit (20).

7. The insertion unit as claimed in claim 6, wherein the insertion housing (2), on an inflow side, is releasably connectable to an attachment sieve or filter sieve (21).

8. The insertion unit as claimed in claim 7, wherein the at least one holding-down unit (20) is provided on an outflow side on the attachment sieve or filter sieve (21).

9. The insertion unit as claimed in claim 8, wherein the at least one holding-down unit (20) is configured as a holding-down pin which is oriented in the direction of continuous flow and is integrally molded on the attachment sieve or filter sieve (21).

10. The insertion unit as claimed in claim 1, wherein the web ends or string ends (6, 7) of the web-shaped or string-shaped flow restrictor (5) include a thickening, and the thickenings of the flow restrictor (5) are held in holding openings (18, 19) of the continuous flow regulator (3).

11. The insertion unit as claimed in claim 10, wherein the through flow opening (4), on both sides of the wall sections (8, 9) which are transversely oriented to the longitudinal extent, opens out in the holding openings (18, 19).

12. The insertion unit as claimed in claim 1, wherein the insertion housing (2), at least in a part-region, has a rectangular cross section, and longitudinal sides of the insertion housing, compared thereto, in relation to broad sides which are transversely oriented to the longitudinal extent of the insertion housing (2), have a greater length.

13. The insertion unit as claimed in claim 1, wherein the insertion unit (1) has a jet controller (22) which, in the direction of flow, is downstream of the continuous flow regulator (3).

14. The insertion unit as claimed in claim 13, wherein the insertion housing (2) is configured in multiple parts and includes a regulator housing (27) and also a jet controller housing (28) which is connectable to the regulator housing (27).

15. The insertion unit as claimed in claim 14, wherein the jet controller (22) is configured as an aerated jet controller (22) which includes a jet splitter (23) which divides the inflowing water into a multiplicity of individual jets, and the insertion housing (2) has at least one aeration opening (29) which is disposed in a housing part-region which is immediately downstream of the jet splitter (23).

16. The insertion unit as claimed in claim 1, wherein the flow restrictor (5), at least in a part-region which is disposed between the web ends or string ends (6, 7) thereof, has a round or oval cross section.

\* \* \* \* \*